United States Patent [19]

Fujie et al.

[11] Patent Number: 5,025,187
[45] Date of Patent: Jun. 18, 1991

[54] ACTUATOR AND CONTROL SYSTEM FOR CLEANING OF MIRROR-LIKE OBJECTS

[75] Inventors: Naofumi Fujie, Nagoya; Tomoaki Imaizumi, Hoi; Koji Ito, Kariya; Shoji Okada, Toyota, all of Japan

[73] Assignee: Aisin Seiki Kabushiki Kaisha, Kariya, Japan

[21] Appl. No.: 576,165

[22] Filed: Aug. 23, 1990

Related U.S. Application Data

[63] Continuation of Ser. No. 357,960, May 30, 1989, abandoned.

[30] Foreign Application Priority Data

| May 30, 1988 | [JP] | Japan | 63-132205 |
| May 31, 1988 | [JP] | Japan | 63-134920 |
| Jul. 21, 1988 | [JP] | Japan | 63-182659 |

[51] Int. Cl.⁵ ........................................ H01L 41/08
[52] U.S. Cl. ................... 310/323; 15/250 R; 310/324; 310/330; 310/359; 310/369; 310/316
[58] Field of Search ............... 310/321–324, 310/328, 334, 358, 316, 369, 330–332; 15/250 R, 250 B; 134/1

[56] References Cited

U.S. PATENT DOCUMENTS

| 3,171,683 | 3/1965 | Ludwig | 15/250 R |
| 3,180,626 | 4/1965 | Mettler | 310/322 X |
| 3,191,913 | 6/1965 | Mettler | 310/322 X |
| 3,873,947 | 3/1975 | Johnson | 310/321 X |
| 3,904,274 | 9/1975 | Feinleib et al. | 310/328 X |
| 3,928,063 | 12/1975 | King, Jr. et al. | 29/25.35 |
| 3,955,545 | 5/1976 | Priegel | 310/321 X |
| 4,352,961 | 10/1982 | Kumada | 310/321 X |
| 4,533,219 | 8/1985 | Aldrich | 310/328 X |
| 4,768,256 | 9/1988 | Motoda | 310/323 X |

FOREIGN PATENT DOCUMENTS

| 1412224 | 8/1965 | France | 15/250 R |
| 0145046 | 11/1980 | Japan | 15/250 R |
| 0070754 | 5/1982 | Japan | 15/250 R |

*Primary Examiner*—Mark O. Budd
*Attorney, Agent, or Firm*—Burns, Doane, Swecker & Mathis

[57] ABSTRACT

An actuator and actuator control system is provided for use with a mirror-like surface and is used to remove foreign substances from the mirror-like surface. The actuator may be a piezoelectric device and the control system operates the device in a predetermined vibratory manner to remove the foreign substance.

14 Claims, 12 Drawing Sheets

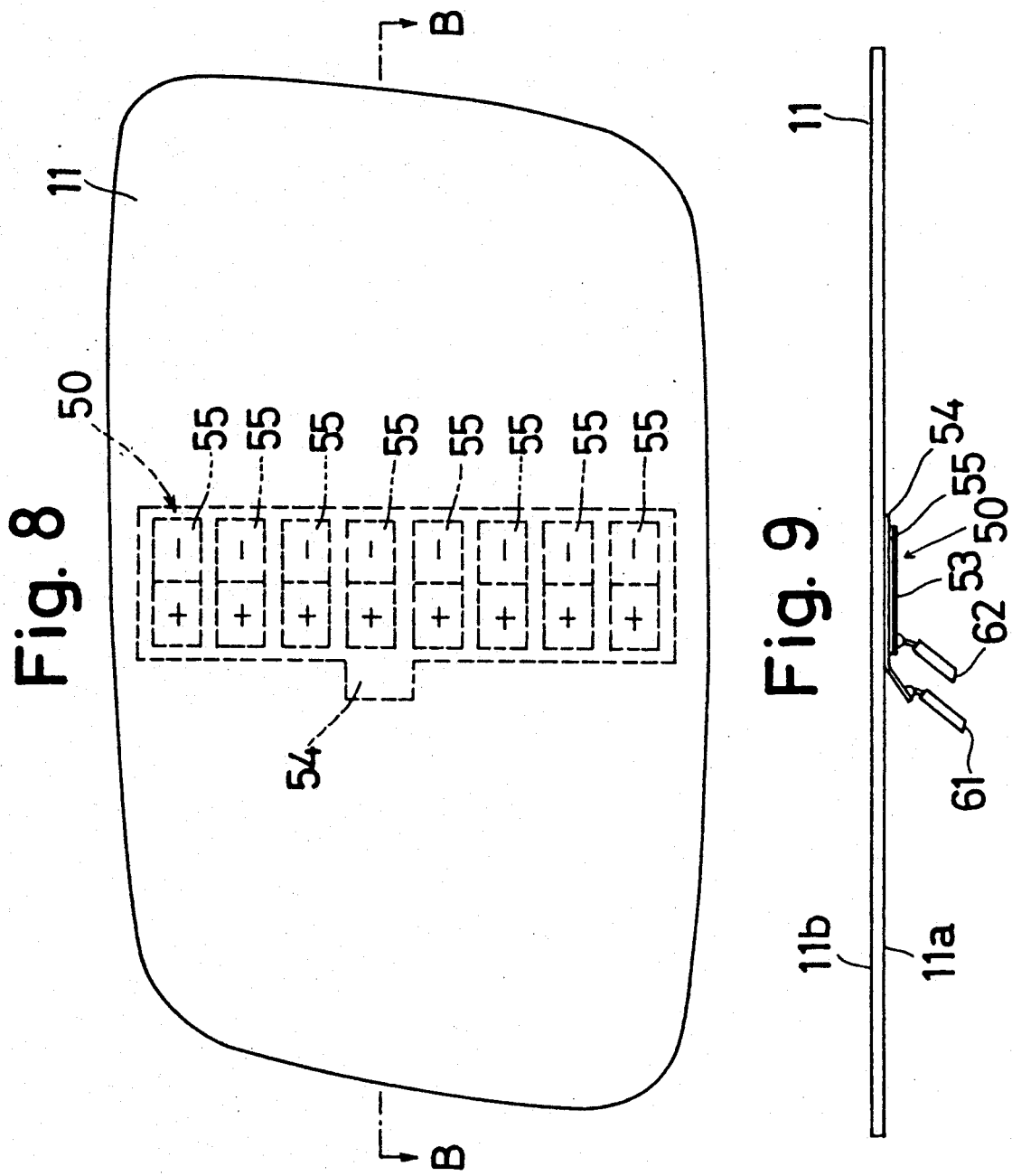

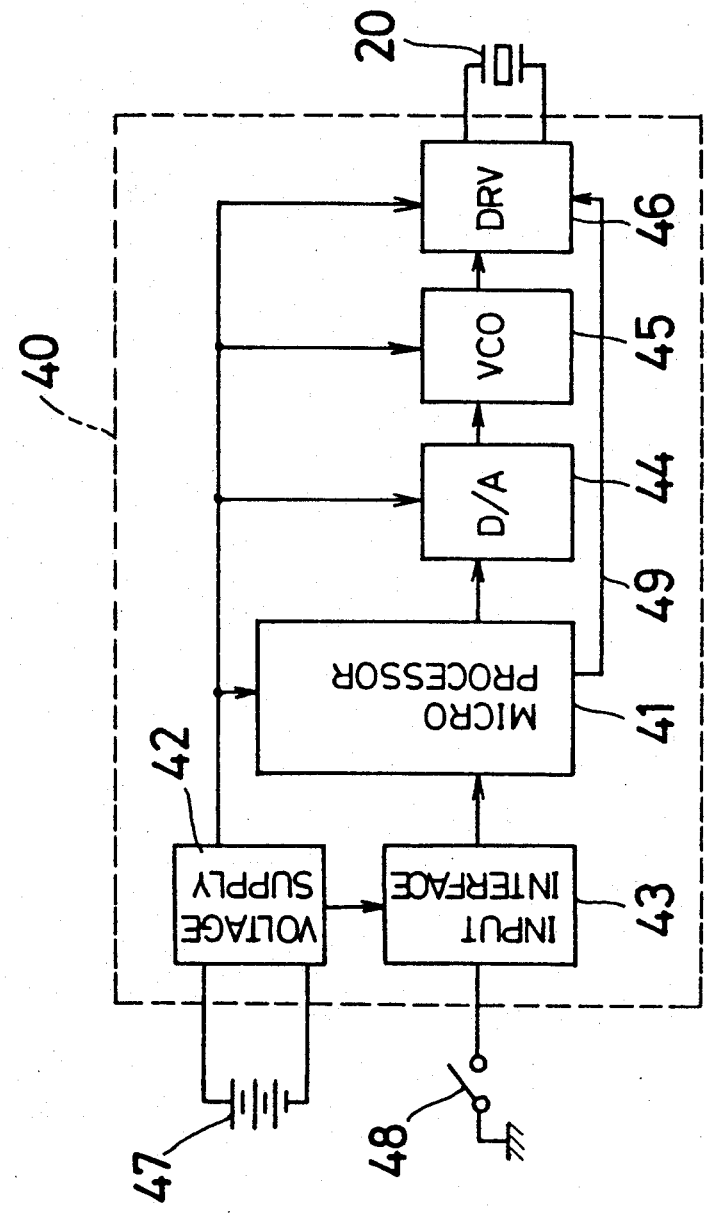

ACTUATOR AND CONTROL SYSTEM FOR CLEANING OF MIRROR-LIKE OBJECTS

This application is a continuation of application Ser. No. 07/357,960, filed May 30, 1989 now abandoned.

BACKGROUND OF THE INVENTION

1. Field of the Invention

This invention relates to a self-cleaning plate shaped-device for removing foreign substances from a plate member.

2. Description of the Related Art

Japanese laid-open patent publication No. 59,8548 published on Jan. 17, 1984 discloses a conventional cleaning device (see FIG. 16). In this device, a plate member 1 is provided as a rear-view mirror for an automobile. A piezo-electric vibrator 2 is fixed to the plate member 1. The vibrator 2 is substantially the same size as the plate member 1. An oscillator 3 is electrically connected to the vibrator 2 in order to supply A.C. power thereto. When the plate member 1 is oscillated by the vibrator 2, water drops on the plate member 1 are removed therefrom as they are caused to drip down and off the plate member and because they are atomized into a spray.

The size of the vibrator 2 should be substantially the same size as the plate member 1 in order to remove the water drops from the whole plate member 1. When the vibrator 2 is increased in size to be larger than the plate member, the vibrator 2 cannot be vibrated uniformly and localized vibration may be generated. Due to this localized vibration, the A.C. power is consumed inefficiently.

Japanese Utility Model laid-open patent publication No. 62-191550 published on Dec. 5, 1987 discloses another conventional cleaning device (see FIG. 17). In this device, the vibrator 2' is fixed substantially center of the plate member 1. The vibrator 2' is of smaller size than the plate member 1 and expands and contracts in a thickness direction thereof, i.e., in the direction of the arrow A.

In this device, the vibrator 2' can be vibrated uniformly, and the A.C. power may be conserved because the vibrator 2' is smaller than the plate member.

However, the thickness of the vibrator 2' cannot be reduced because the resonant frequency of the vibrator 2' increases according to reduction of the thickness thereof. If the resonant frequency of the vibrator 20 increases, the plate member 1 receives vibrations having a high frequency. At this time, a longitudinal wave may be generated on the entire plate member 1; however, the longitudinal wave is inefficiently transferred to the whole plate member 1. Accordingly, a strong vibration may be generated only on a portion of the plate member where the vibrator 2' is fixed, but only a weak vibration is generated on other portions of the plate member 1. As a result, the water drops off the plate at the portion near the vibrator 2', but the water remains at the other portions which are displaced from the vibrator 2'.

SUMMARY OF THE INVENTION

Accordingly, one of the object of this present invention is to obviate the above conventional drawbacks.

Further, it is object of this invention to remove the water drops from the entire surface of a plate member.

Furthermore, it is another object of this invention to generate both a longitudinal wave and a side wave on a plate member.

Yet a further object of this invention is to reduce the thickness of the vibrator.

It is also an object of this invention to conserve electric power supplied to a vibrator.

To achieve the above objects, and in accordance with the principles of the invention as embodied and broadly described herein, the self-cleaning device comprises a generally planar member, and vibrating means mounted on the plate member for propagating oscillations in the plate member substantially entirely parallel to the plane of the plate member for removing foreign substances from the plate member.

Preferably, the vibrator means includes an oscillator means for resonating the plate member at least at two different frequencies.

More preferably, the vibrator means includes an oscillator means for generating both a longitudinal wave and a side wave in the plate member.

BRIEF DESCRIPTION OF THE DRAWINGS

The accompanying drawings, which are incorporated in and constitutes a part of the specification, illustrate an embodiment of the invention and serve to explain the principles of the invention.

FIG. 8 is a plane view of a rear-view mirror of an automobile in accordance with the second embodiment of this invention;

FIG. 9 is a cross-sectional view taking along line IX—IX in FIG. 1;

FIG. 11 is a block diagram showing an oscillator of this invention;

DETAILED DESCRIPTION OF THE PREFERRED EMBODIMENTS

References will now be made in detail to the preferred embodiments of the invention, examples of which are illustrated in the accompanying drawings.

Figure 1:
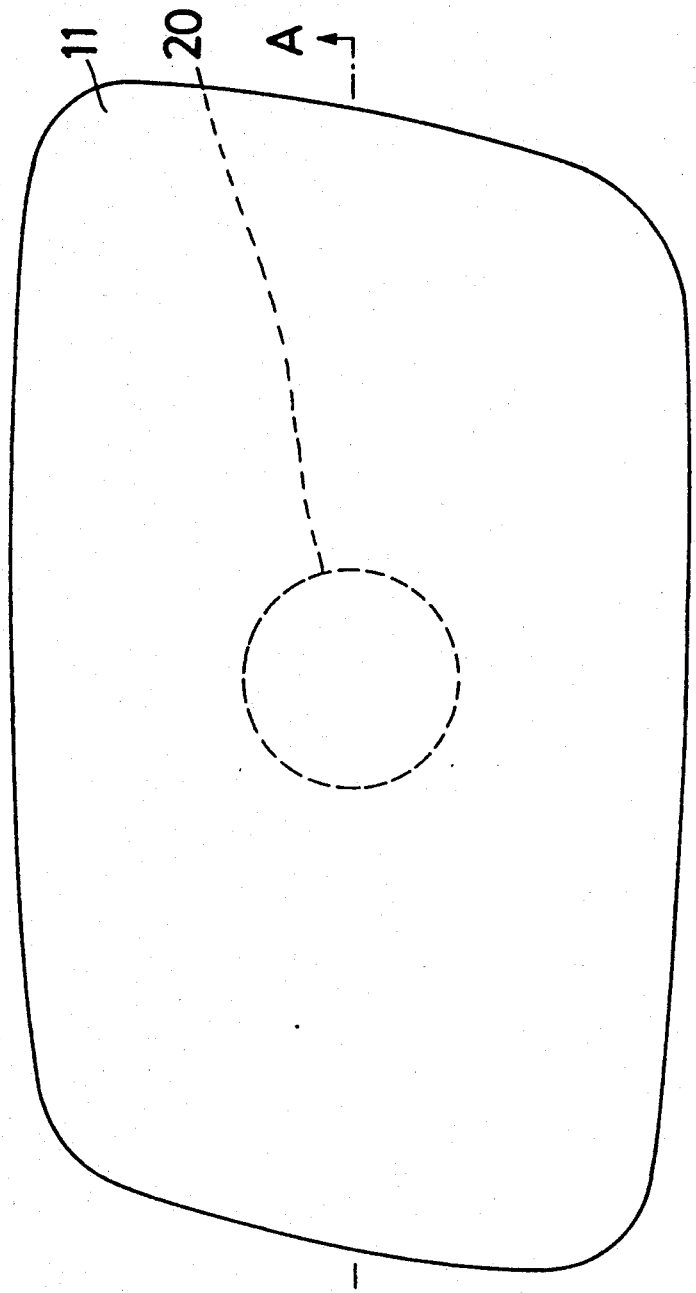
FIG. 1 is a plan view of a rear-view mirror of an automobile in accordance with a first embodiment of this invention.
Figure 2:
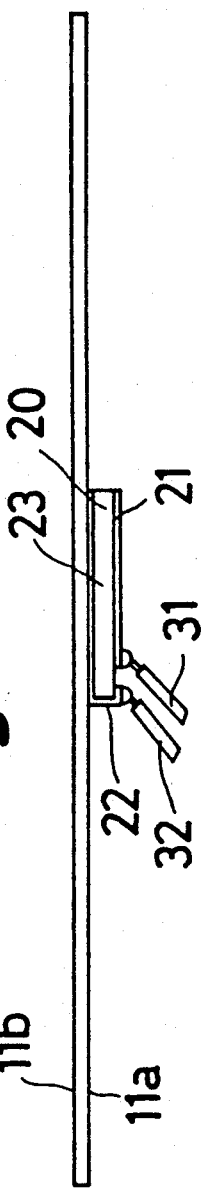
FIG. 2 is a cross-section view taking along line II—II in FIG. 1.
Figure 3:
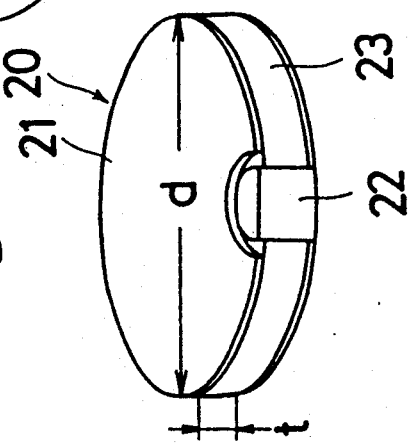
FIG. 3 is a plan view of a piezo-electric vibrator in accordance with the first embodiment of the invention.

Referring now to FIGS. 1, 2 and 3, a self-cleaning plate shaped device is disclosed. A disc-shaped piezo-electric element 20 is adhered to the rear of the device 11 substantially in the center thereof, so that the area of contact between the element 20 and the device 11 is substantially less than the area of the device 11. The piezo-electric vibrator 20 has a pair of electrodes 21, 22 which are oppositely positioned with respect to each other. The electrodes 21, 22 are integrally formed on each opposed surface of a piezo-electric element 23. A conductive wire 31 is soldered to the electrode 21 and a conductive wire 32 is soldered to the electrode 22. The electrode 22 is rigidly adhered to the back side 11a of the mirror 11. The piezo-electric vibrator is expanded and contracted not only in a thickness direction of the vibrator 20 (i.e., in the upward and downward directions as shown in the FIG. 2) but also in a radial direction of the vibrator 20 (i.e., in the right and left directions as shown in the FIG. 2), when A.C. power is supplied to the vibrator 20 through the conductive wires 31, 32.

The piezo-electric vibrator 20 has two different resonant modes. One of the resonant modes is related to the vibration in the thickness direction of vibrator 20, as explained above. The other resonant mode is related to the vibration in the radial direction of the vibrator 20 as explained above. In the first embodiment, the piezo-electric vibrator 20 is of substantially disc-shape as shown in FIG. 3. Accordingly, a thickness (t) is less than the diameter (d) of the vibrator 20. Therefore, a resonant frequency in the thickness direction is higher than the resonant frequency in the radial direction of the vibrator 20.

Similar to the vibrator 20, the mirror 11 also has two different resonant modes. One of the resonant modes is related to the vibration in the thickness direction of mirror 11, and the other resonant mode is related to the vibration along the surface of the mirror 11, i.e., a sideways direction parallel to the plane of the mirror. The resonant frequency toward the thickness direction of the mirror 11 is higher than the other resonant frequency along the surface of the mirror 11, because the thickness is less than the length of the mirror 11.

Thus, both the vibrator 20 and the mirror 11 have two corresponding resonant modes. Therefore, the two resonant modes still exist after adhering the vibrator 20 to the mirror 11. Table 1 shows characteristics of the first embodiment.

TABLE 1

| | |
|---|---|
| piezo-electric element 23 | disc shape:<br>diameter = 30 mm, thickness = 2.8 mm |
| mirror 11 | almost parallelogram:<br>160 mm × 90 mm, thickness = 1.1 mm |
| resonant frequencies of the mirror 11 with the vibrator | along the surface: 75kHz<br>toward the thickness: 720kHZ |

Figure 4A:
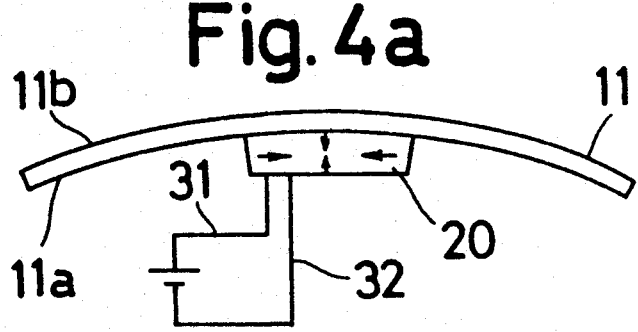
FIGS. 4a, 4b, 4c and 4d are diagrams for explaining operation of the vibrator in accordance with embodiments of this invention.

Referring now to FIG. 4a, operation of the first embodiment is explained. When the conductive wire 31 is connected to the "+" terminal of a battery and the conductive wire 32 is connected to the "−" terminal of the battery, the vibrator 20 is contracted mainly along the back surface 11a of the mirror 11. At this time, the back surface 11a of the mirror 11 receives a large compressive stress from the vibrator 20. As a result, the mirror 11 is bent by the vibrator 20 as shown in FIG. 4a.

Figure 4B:
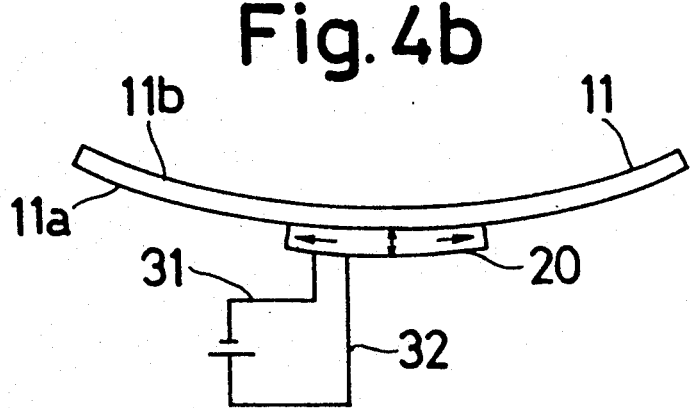
Figure 4C:
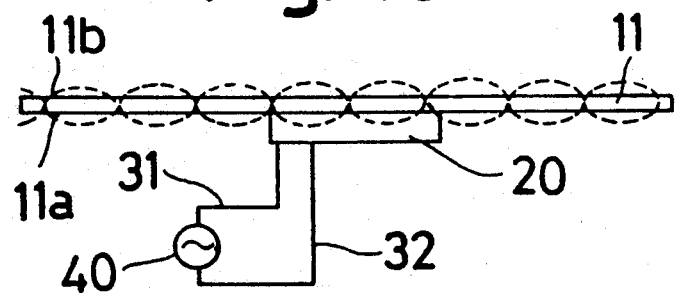

When the conductive wire 31 is connected to the "−" terminal of the battery and the conductive wire 32 is connected to the "+" terminal of the battery in FIG. 4b, the vibrator 20 is expanded mainly along the back surface 11a of the mirror 11. At this time, the back surface 11a of the mirror 11 receives a large expansion stress from the vibrator 20. As a result, the mirror 11 is bent by the vibrator 20 in a direction opposite to that shown in FIG. 4a.

When the conductive wires 31, 32 are connected to an oscillator 40 and A.C. power is supplied to the vibrator 20, the vibrator 20 is repeatedly expanded and contracted. As a result, the mirror 11 is repeatedly bent. When a frequency of the oscillator 40 is selected properly, i.e., when the frequency is selected to be about 75 (KHz) in the first embodiment, a uniform standing wave having a large amplitude is generated on the whole mirror 11 due to resonance along the surface of the mirror 11. The reflecting surface 11b is moved with high velocity by the standing wave. Therefore, water droplets on the mirror 11 receive high kinetic energy from the mirror 11. Upon transfer of the kinetic energy, the water droplets drop off and are atomized away from the reflecting surface 11b of the mirror 11.

The piezo-electric vibrator 20 has own resonant frequency due to its dimension and shape. Accordingly, it is desirable for dimensions and shape of the vibrator 20 to be selected based on the resonant frequency of the mirror 11. A typical automotive mirror 11 which is commercially available has a resonant frequency from 70 (KHz) to 80 (KHz) approximately. Therefore, the piezo-electric vibrator 20 which has a resonant frequency from 70 (KHz) to 80 (KHz) approximately is preferable for the self-cleaning plate shaped device.

Figure 5:
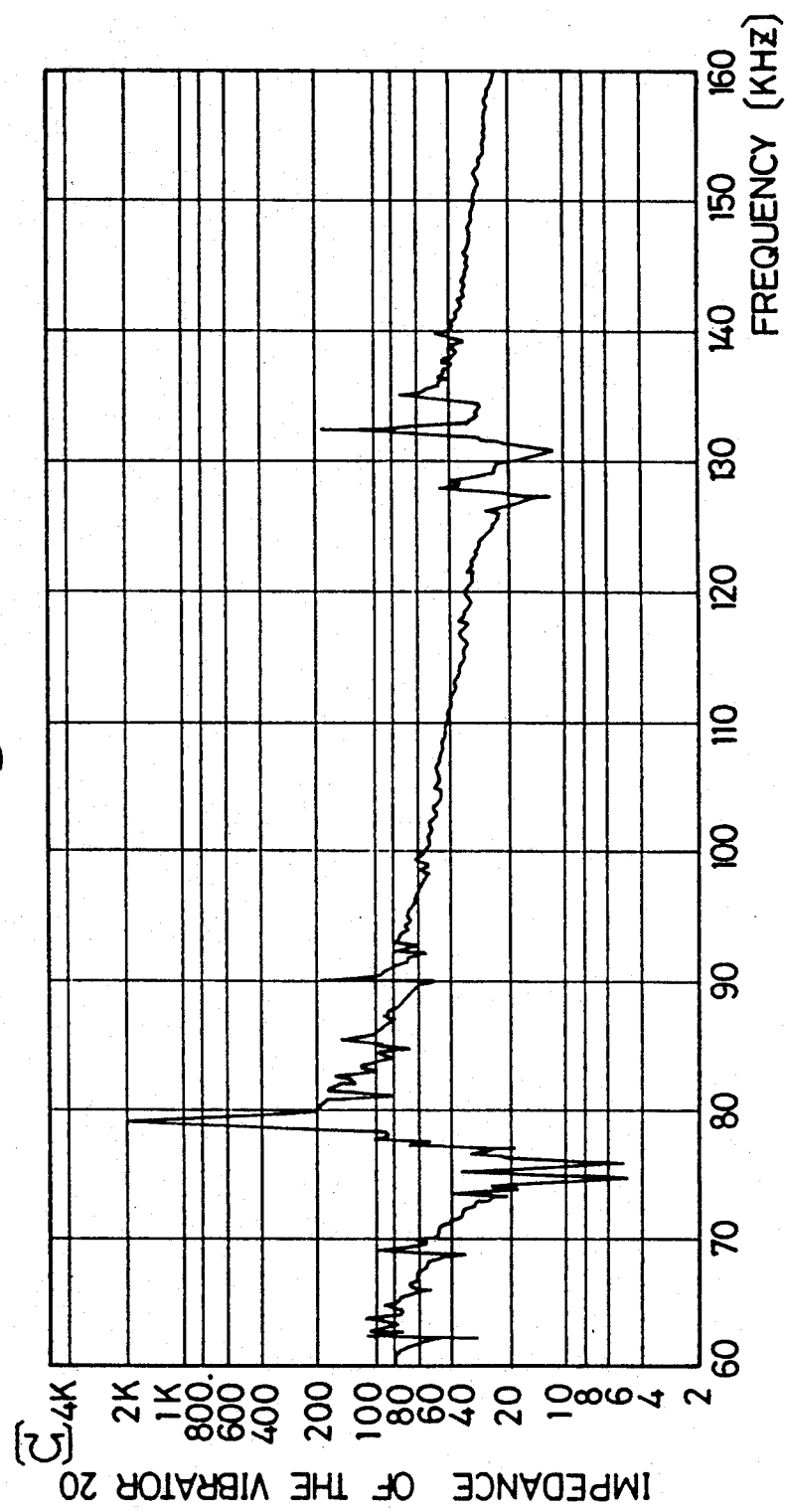
FIG. 5 is a graph showing the electrical character of the vibrator in accordance with the first embodiment of this invention.

FIG. 5 shows a characteristic of the piezo-electric vibrator 20 in the first embodiment. This characteristic was measured with a typical automotive mirror 11 which was commercially available. The vibrator 20 was fixed to the center of gravity of the mirror 11. The dimensions of the mirror 11 and vibrator 20 are shown in Table 1.

As shown in FIG. 5, the impedance of the piezo-electric vibrator 20 varied substantially in the 70 (KHz) to 80 (KHz) range. Accordingly, it is evident from this characteristic that there are resonant frequencies between 70 (KHz) and 80 (KHz).

Further, the moving velocity of the reflecting surface 11b of the mirror 11 was greater than 300 (mm/s) at the center of the vibrator 20, and was greater than 1000 (mm/s) at the outer circumference of the mirror 11.

Furthermore, the vibration on the mirror 11 did not change significantly due to the position where the vibrator 20 was adhered. Accordingly, the vibrator 20 need not necessarily be adhered to the center of gravity of the mirror 11.

Figure 6:
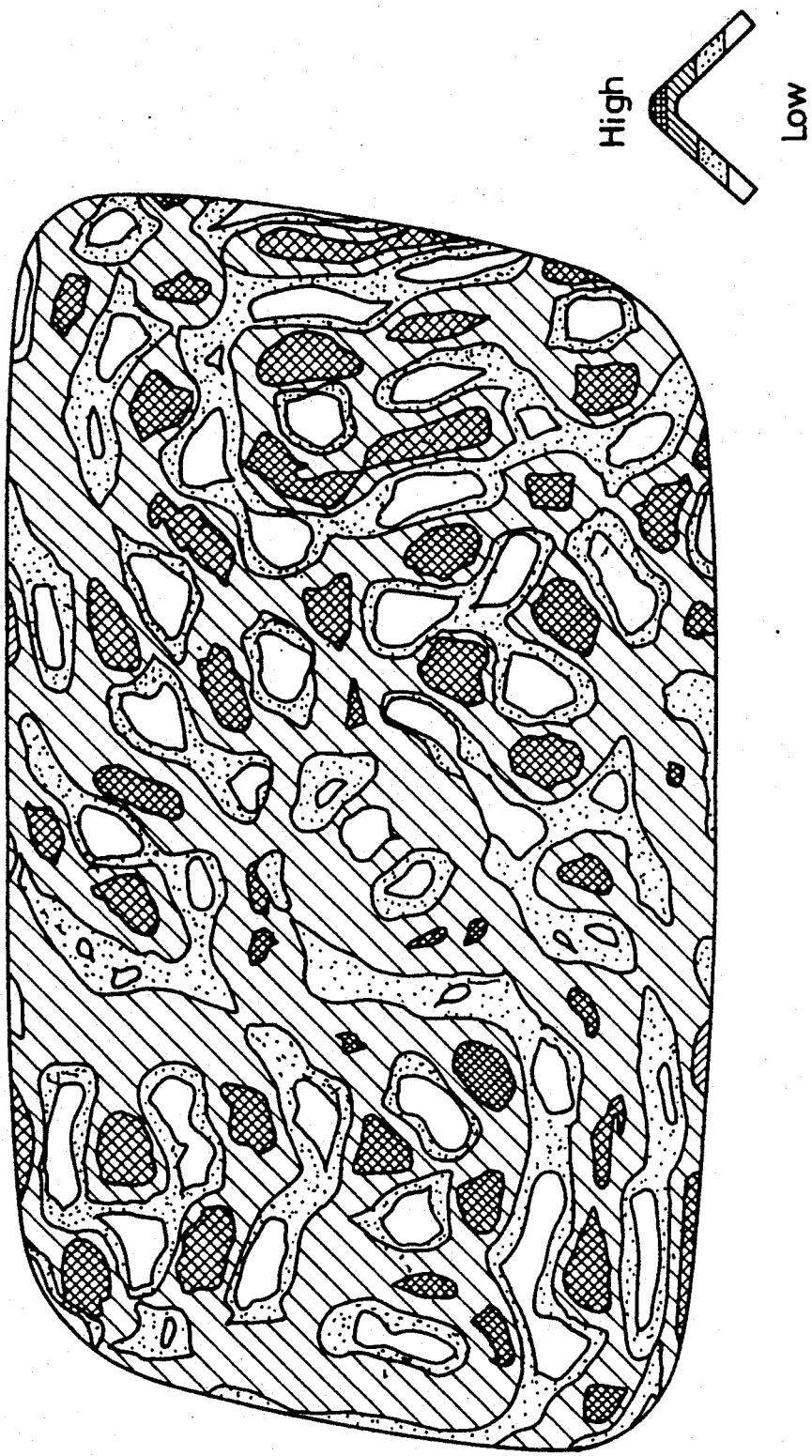
FIG. 6 is a distribution chart showing the distribution of the vibrator amplitudes on a mirror in accordance with the first embodiment of this invention.

FIG. 6 shows a distribution chart of the vibration on the mirror 11. This chart is created by a computer analysis of the Finite Element Method. This distribution chart clearly shows that nodes and loops of the vibrations are distributed on the whole mirror 11 uniformly. Water droplets are removed from portions on the mirror 11 where the moving velocity exceeds a predetermined level. That is to say, water drops on the mirror 11 are removed from the portions near the loops of the vibration. Accordingly, the water drops are removed from the whole mirror 11 despite the size of the smaller vibrator 20 in the first embodiment. Further, the mirror 11 does not generate an aural noise as the vibrator 20 oscillates about 75 (KHz) which is higher than the audible frequency.

In the first embodiment, the disc shaped vibrator 20 is utilized. The disc shaped vibrator 20 is preferable for the cleaning apparatus, because a continuous wave which surrounds the vibrator 20 is generated on the mirror 11. Therefore, a uniform vibration can be generated on the mirror 11 by the continuous wave which surrounds the vibrator 20.

Referring now to FIGS. 7a, 7b, 8, 9, 10a, 10b and 10c, the second embodiment is explained.

First, a piezo-electric device 50 is explained. A basic unit of the piezo-electric 50 comprises electrode 54, electrodes 51, 52, piezo-electric element 55 and electrode 53. The piezoelectric element 55 has two portions which are oppositely polarized. One portion between the electrodes 51 and 53 is positively polarized, while the other portion between the electrodes 52 and 53 is negatively polarized. The electrode 51 is electrically connected to the electrode 52 by the electrode 54. Accordingly, if the D.C. voltage is applied between the electrodes 53, 54, one portion of the piezoelectric element is expanded and the other portion is contracted.

The piezo-electric vibrator 50 includes eight basic units which are arranged in one line along an extended direction of the electrodes 53, 54. The piezo-electric vibrator 50 is adhered to the middle of the mirror 11. A conductive wire 61 is soldered to an electrode 54. The other conductive wire 62 is soldered to the other electrode 53. As in the first embodiment, the mirror 11 is vibrated by the vibrator 50 which expands and contracts along the surface of the mirror 11.

Figure 10A:
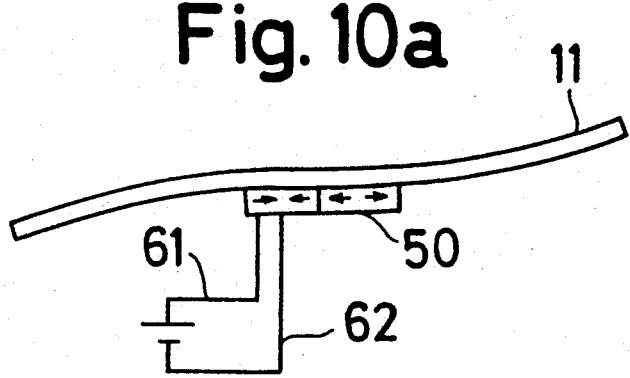
FIGS. 10a, 10b and 10c are diagrams for explaining operation of the vibrator in accordance with the second embodiment of this invention.

Referring now to FIG. 10a, operation of the second embodiment is explained. When the conductive wire 61 is connected to the "+" terminal of the battery and the conductive wire 62 is connected to the "−" terminal of the battery, one half of the vibrator 50 is contracted mainly along the surface of the mirror 11, and the other half of the vibrator 50 is expanded mainly along the surface of the mirror 11. At this time, the mirror 11 is bent like a reverse shape of the letter "S".

Figure 10B:
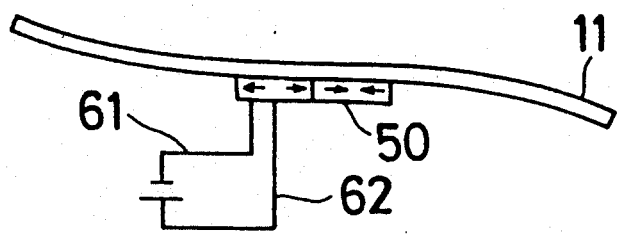
Figure 10C:
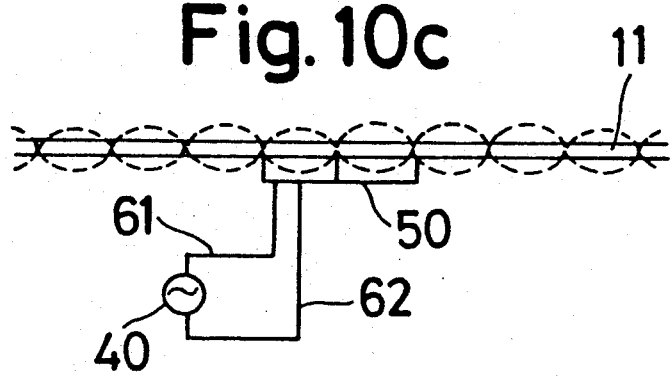

When the conductive wire 61 is connected to the "−" terminal of the battery and the conductive wire 62 is connected to the "+" terminal of the battery in FIG. 10b, one half of the vibrator 50 is expanded mainly along the surface of the mirror 11 and the other half of the vibrator 50 is contracted mainly along the surface of the mirror 11. At this time, the mirror 11 is bent substantially in the shape of the letter "S".

When the conductive wires 61, 62 are connected to the oscillator 40 and A.C. power is supplied to the vibrator 50, the vibrator 50 is expanded and contracted repeatedly. As a result, the mirror 11 is repeatedly bent. When a frequency is selected properly, a uniform standing wave having a large amplitude is generated on the whole mirror 11 due to resonance of the mirror 11. The reflecting surface 11b is moved with high velocity by the standing wave. Therefore, the water droplets drop off and are atomized away from the reflecting surface 11b on the mirror 11.

Figure 7A:
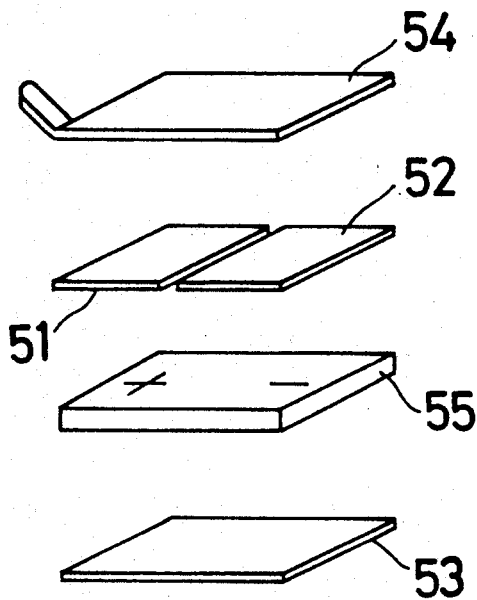
FIG. 7a is an exploded view in perspective of a basic unit of a piezo-electric vibrator in accordance with a second embodiment of this invention.
Figure 7B:
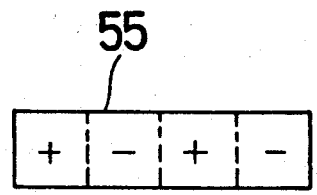
FIG. 7b is an exploded view in perspective of a modified piezo-electric vibrator in accordance with the second embodiment of this invention.
Figure 17:
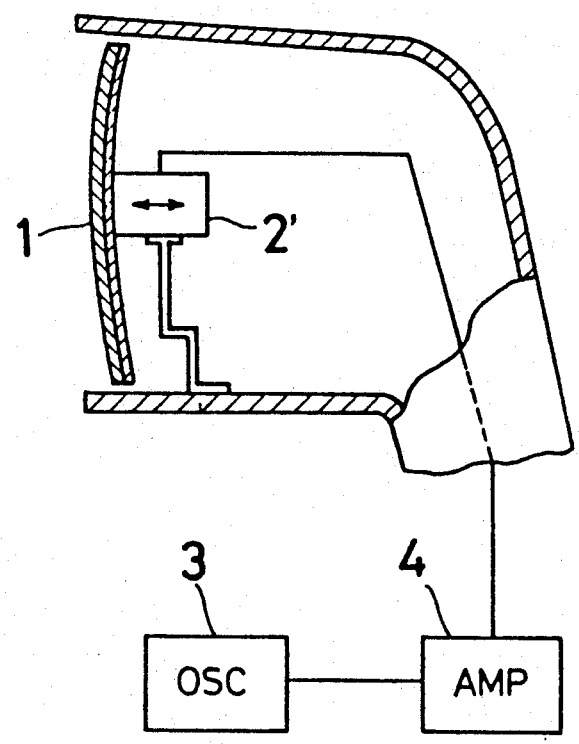
FIGS. 16 and 17 are cross-sectional views showing conventional devices.
Figure 16:
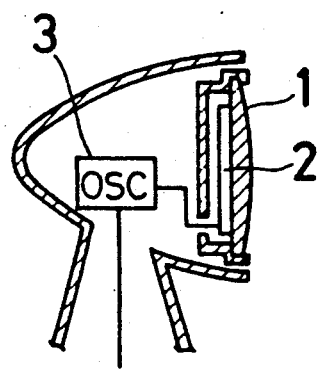

In the second embodiment, plural basic units, which are shown in FIG. 7a, are arranged in one line along an extended direction of the electrodes 53, 54. However, the basic units of the vibrator 50 can be arranged in other patterns. For example, as shown in FIG. 7b, if a pair of the positive polarized portion and negative polarized portion is arranged in series, the mirror 11 can be bent to a greater degree than in the prior embodiment.

More time is required on the nodes of the standing wave compared to the loops of the standing wave. Therefore, when the mirror 11 vibrates, many minute water droplets remain on the nodes of the standing wave. Accordingly, the reflecting surface 11b of the mirror 11 seems to collect moisture. The minute water drops which remains on the mirror 11 can be removed by vibrating the mirror 11 for a greater time. However, such minute water droplets reduce a high grade image of the self-cleaning plate shaped device. Further, kinetic energy is consumed wastefully on the loops of the standing wave, while the mirror 11 is vibrated until the minute water drops are removed.

In this embodiment, the improved oscillator 40 is installed in order to move the loops and nodes of the standing wave. Referring to FIG. 11, the oscillator 40 is explained.

The oscillator 40 comprises a micro-processor 41, a voltage supply 42, an input interface 43, a D/A converter 44, a voltage controlled oscillator 45 and a driving circuit 46. The voltage supply 42 is connected to the battery 47. The voltage supply 42 supplies the electric power to each circuit of the oscillator 40. Further, a start switch 48 is connected to the input interface 43. The start switch 48 is provided in the automotive compartment and is manually operated. When the start switch 48 is turned on, the oscillator 40 supplies the A.C. power to the piezo-electric vibrator 20.

The frequency of the A.C. power which is supplied to the vibrator 20 is determined by the voltage controlled oscillator 45. The voltage controlled oscillator 45 is controlled by a micro-processor 41 through the D/A converter 44.

The driving circuit 46 is interconnected between the voltage controlled oscillator 45 and the vibrator 20. A strobe signal 49 is fed to the driving circuit 46 from the micro-processor 41. The driving circuit 46 supplies the A.C. power to the vibrator 20 while the strobe signal 49 is fed.

Figure 12:
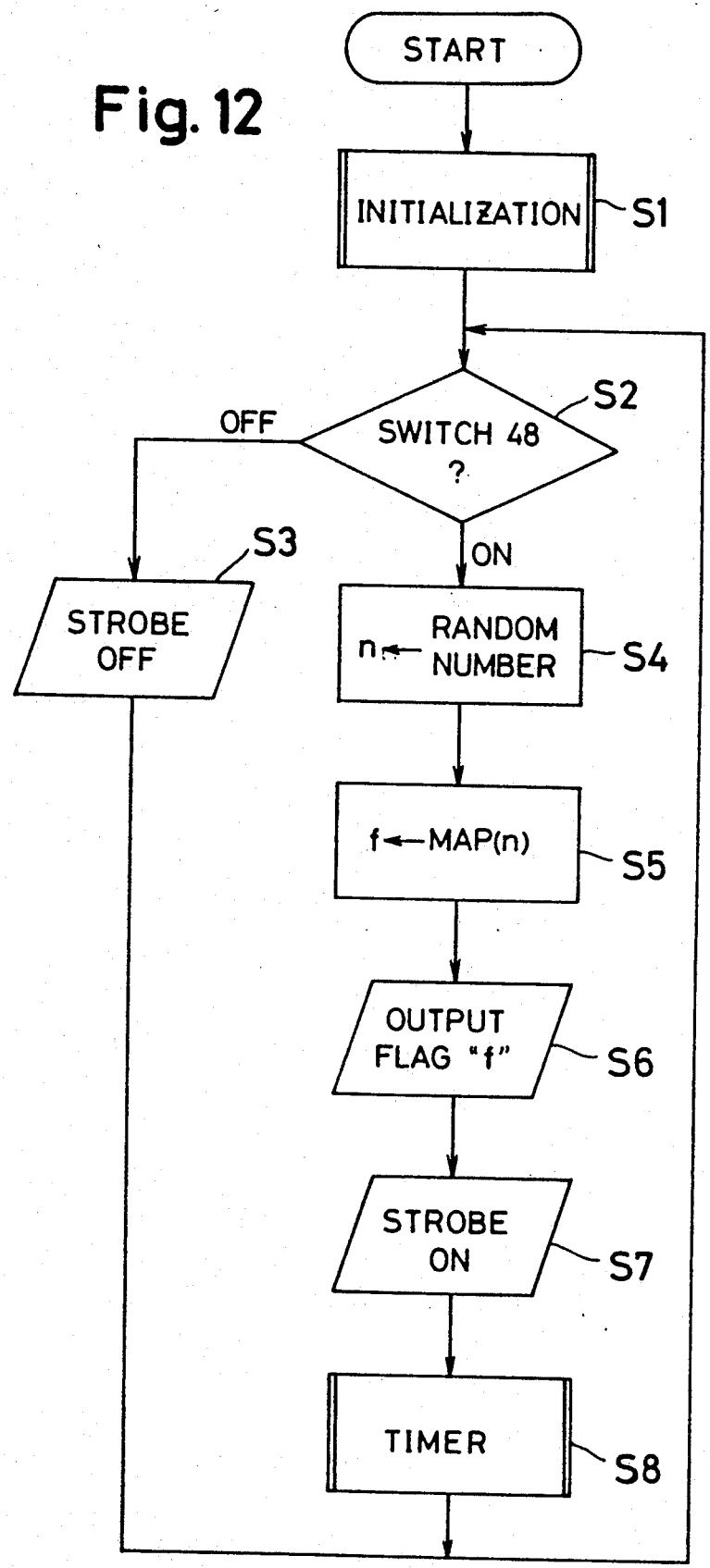
FIGS. 12, 13, 14, and 15 are flowcharts showing programs which are executed in the oscillator of this invention.
Figure 13:
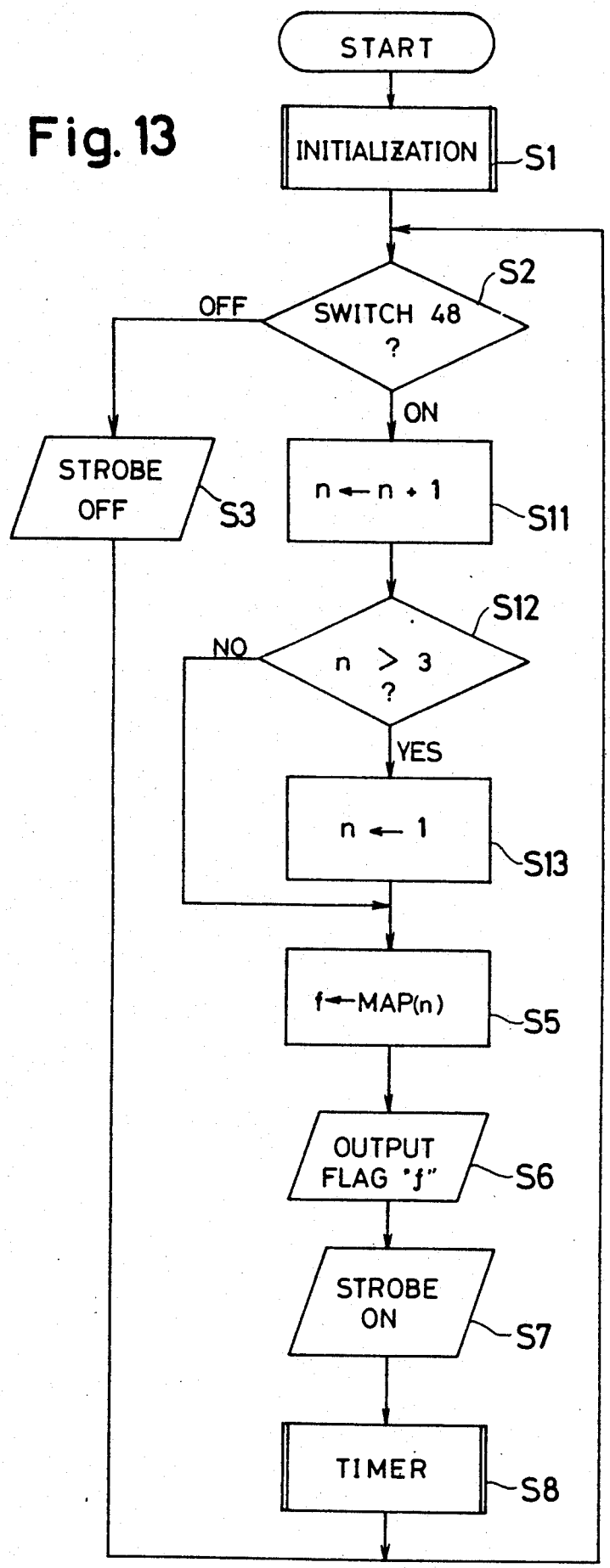
Figure 14:
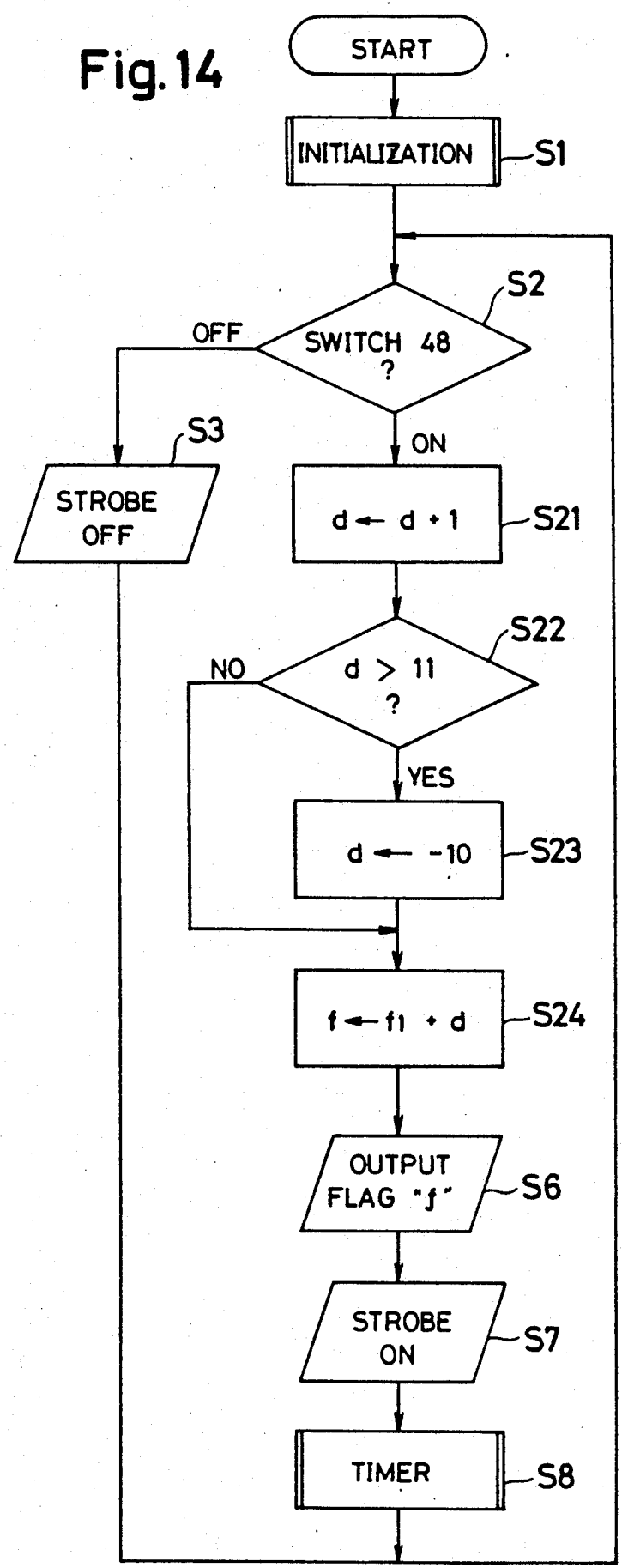

Output frequency of the oscillator 40 can be controlled by a program which is stored and executed in the micro-processor 41. FIGS. 12, 13 and 14 show examples of the programs which can be executed in the micro-processor 41.

According to the program shown in FIG. 12, one of the resonant frequencies for resonating the mirror 11 is generated selectively in random order.

According to the program shown in FIG. 13, one of the resonant frequencies for resonating the mirror 11 is generated selectively in a predetermined order.

According to the program shown in FIG. 14, variable frequencies which includes one resonance frequency for resonating the mirror 11 are generated.

First, the program which is shown in FIG. 12 is explained. As soon as the power supply 42 is connected to the battery 47, step (S1) is executed. In the step (S1), an initialization for executing the following steps is performed. Under the initialization in step (S1), the strobe signal is turned off.

In the step (S2), a judgment is performed. If the start switch 48 is turned off, the next step (S3) is executed. In the step (S3), the strobe signal is turned off. However, if the start switch 48 is turned on, steps (S4–S8) are executed in order to vibrate a vibrator 20.

In the step (S4), a random number is stored in a flag (n). In this step (S4), one of the numbers "1", "2" and "3" is stored in flag (n) at random. In the step (S5), Table 2 is referred to, and a parameter which corresponds to the stored number in flag (n) is memorized in flag (f). The parameter in flag (f) corresponds to the frequency which is generated by the oscillator 45. All of the parameters which are capable of establishing in the flag (f) are corresponding to the resonant frequency of the mirror 11.

TABLE 2

| flag (n) | flag (f) | frequency of the oscillator 45 |
|---|---|---|
| "1" | 50 | 37 (KHz) |
| "2" | 85 | 74 (KHz) |
| "3" | 150 | 148 (KHz) |

In the step (S6), the parameter in flag (f) is fed to the D/A converter 44. At this stage, the voltage controlled oscillator 45 oscillates the frequency which is selected by the random number. In the step (S7), the strobe signal is turned on, and the drive circuit 46 supplies the A.C. power to the vibrator 20. In the step (S8), the program is halted within a predetermined period of time.

According to the programs shown in FIG. 12, the oscillator 40 generates one of the resonant frequencies at random on every period of time which is substantially determined by the step (S8), while the start switch 48 is turned on.

Next, referring to FIG. 13, another program is explained. In the program in FIG. 13, steps (S11, S12 and S13) are installed instead of the step (S4) in FIG. 12. According to the procedures in the steps (S11, S12 and S13), the stored number in the flag (n) changes "1"±"2"±"3"±"1"±..., in order. Accordingly, the oscillator 40 generates one of the resonant frequencies in order on every period of time which is substantially determined by the step (S8), while the start switch 48 is turned on.

Next, referring to FIG. 14, the other program is explained. In the program in FIG. 14, steps (S21, S22, S23 and S24) are installed instead of the step (S4) in the FIG. 12. The procedure in steps (S21, S22, S23 and S24) varies the number stored in the flag (n) within a predetermined range having a medium value (f1). In this program, the medium value (f1) is established in flag "85" which corresponds to 74 (KHz). Accordingly, the contents of the flag (f) varies from "75" to "95", and then, the oscillator 40 sweeps the predetermined range of frequency each interval of time which is substantially determined by the step (S8), while the start switch 48 is turned on.

According to the programs in FIGS. 12, 13, and 14, the oscillating frequency of the oscillator 40 is varied. When the oscillating frequency is varied, the nodes and loops are moved because the wave length on the standing wave is changed. Accordingly, kinetic energy can be distributed to the entire mirror 12 uniformly.

As a result, water droplets are removed from the whole mirror 11 simultaneously without minute water drops remaining on the mirror. Further, the power needed for removing the minute water droplets can be conserved. Therefore, the life of the mirror 11 and vibrator 20 can be improved or extended by minimizing heat generation of the vibrator 20.

According to the programs shown in FIGS. 12, 13, and 14, the frequency of the oscillator 40 is established higher than an audible range. Therefore, the mirror 12 does not generate an aural noise.

The portion on the mirror 11 where the vibrator 20 is adhered is hard to bend compared to the other portions. Accordingly, if the water drops are removed by the side wave on the mirror 11, more time is required for removing the water droplets located near the vibrator 20 compared to the other portion of the mirror 11. As a result, minute water droplets seem to remain on the portion where the vibrator 20 is adhered.

Accordingly, in another embodiment, the longitudinal vibration of the vibrator 20 is utilized for removing the water droplets on the portion where the vibrator 20 is adhered.

Figure 4D:
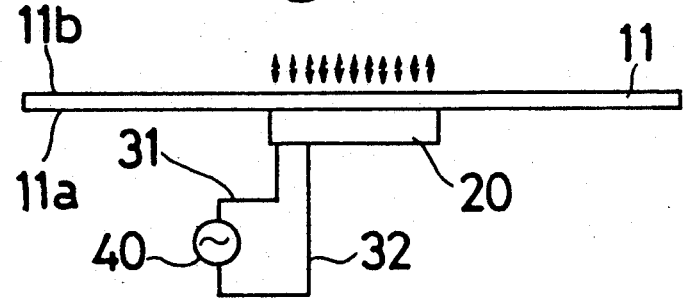

Referring now to FIG. 4d, operation of another program is explained. When a higher resonant frequency of about 720 (KHz) is applied to the vibrator 20, the mirror 11 is repeatedly displaced in thickness direction of the mirror 11. At this time, the longitudinal wave is generated near the portion where the vibrator 20 is adhered. This portion of the mirror 11 is moved at high speed by this longitudinal wave. The water droplets receive high kinetic energy from the mirror 11. The water will drop off and is atomized away from the reflecting surface 11b on the mirror 11.

Figure 15:
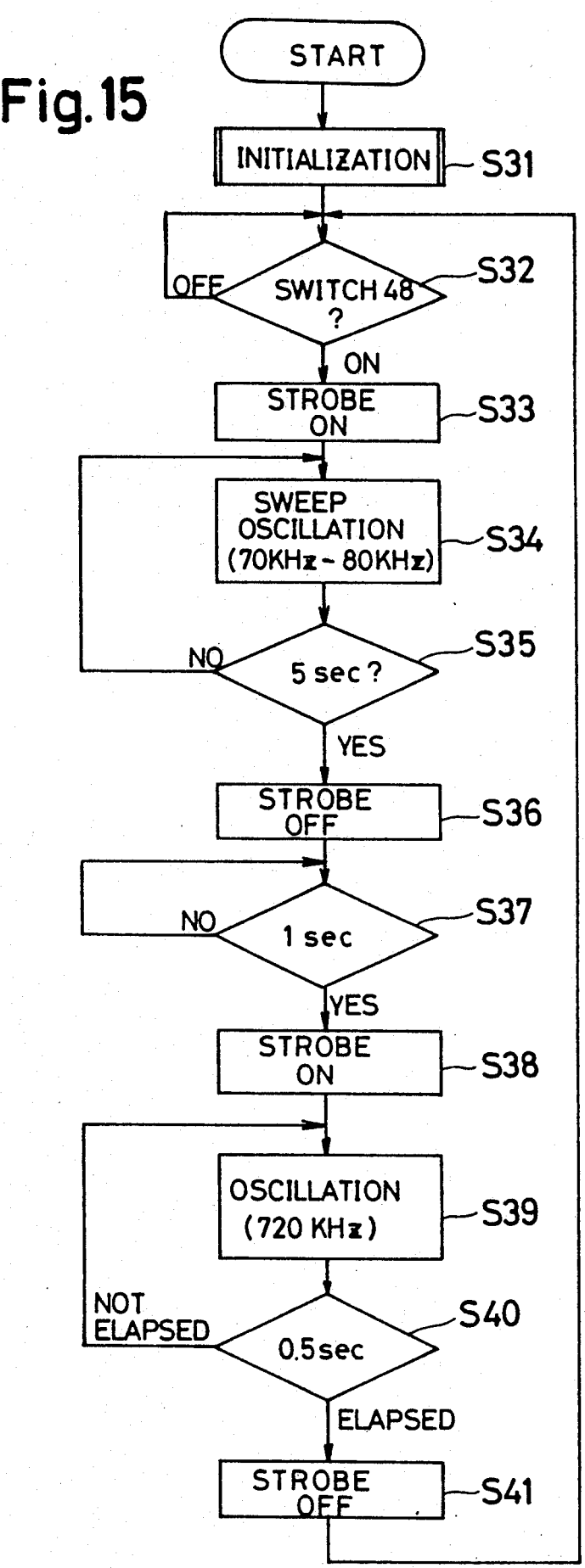

The two oscillating frequencies of the oscillating circuit 40 are alternated repeatedly. FIG. 15 shows the other program.

As soon as the battery 47 is connected to the voltage supply 47, a step (S31) is executed. In the step (S31), an initialization for executing the following procedure is performed. Under the initialization in step (S31), the strobe signal is turned off.

In the step (S32), a judgment is performed. If the start switch 40 is turned off, the step (S32) is executed repeatedly. On the other hand, if the start switch 48 is turned on, the steps from (S33) to (S41) are executed in order to oscillate the vibrator 20.

In the step (S33), the strobe signal 49 is turned on, and A.C. power is supplied to the vibrator 20 from the driving circuit 46. In the steps (S34 and S35), a sweep signal is fed to the D/A converter 44 within 5 sec in order to sweep the frequency of the voltage controlled oscillator 45 from 70 (KHz) to 80 (KHz). In the step (S36), the strobe signal 49 is turned off, and A.C. power to the vibrator 20 is stopped.

In the step (S37), the program is halted within a predetermined period of time.

In the step (S38), the strobe signal 49 turns on again in order to supply A.C. power to the vibrator 20. In the steps (S39 and S40), a proper signal is fed to the D/A converter 45 for about 0.5 sec in order to oscillate the voltage controlled oscillator 45 with 720 (KHz). In the step (S41), the strobe signal 49 is turned off, and A.C. power to the vibrator 20 is stopped.

In the program in FIG. 15, both a side wave and a longitudinal wave are generated alternately on the mirror 11. Accordingly, water droplets are removed from the mirror 11 more cleanly.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A self-cleaning plate unit comprising a generally planar plate member, and vibrating means mounted on said plate member for producing in said plate member a standing wave substantially parallel to the plane of said plate member at a uniform frequency substantially equal to the corresponding resonant frequency of the plate unit, in order to remove foreign substances from said plate member, said vibrating means contacting said plate member over an area substantially smaller than the area of said plate member.

2. The device of claim 1, wherein said vibrating means comprises means for repeatedly bending said plate member in opposite direction.

3. The device of claim 2, wherein said vibrating means comprises means which repeatedly expands and contracts in a plane parallel to the plane of said plate member to produce the repeated bending of said plate member.

4. The device of claim 3, wherein said vibrating means comprises a single vibrator.

5. The device of claim 1, wherein said vibrating means comprises a single vibrator.

6. The device of claim 5, wherein said vibrator comprises a piezo-electric device having different portions arranged to be of opposite polarization.

7. The device of claim 1, wherein said vibrating means includes a substantially circular vibrator, and means for supplying electric power to said vibrator.

8. The device of claim 7, wherein said plate member includes a mirrored surface and a back surface, and said vibrating means is mounted on said back surface.

9. The device of claim 1, wherein said vibrating means includes a substantially rectangular shaped vibrator, and means for supplying electric power to said vibrator.

10. The device of claim 9, wherein said plate member includes a mirrored surface and a back surface, and said vibrating means is mounted on said back surface.

11. The device of claim 9, wherein said vibrating means includes an oscillator means for resonating said plate member at least at the first-named frequency and at a second frequency perpendicularly of the plane of said plate member.

12. The device of claim 1, wherein said vibrating means includes a vibrator for generating inaudible vibrations.

13. The device of claim 1, wherein said vibrator means includes an oscillator means for generating a second wave in said plate member substantially perpendicularly to said first-named wave.

14. The device of claim 13, wherein said oscillator means includes an alternating means for alternately generating the first-named wave and said second wave.

* * * * *